US005151798A

United States Patent [19]

Okubo

[11] Patent Number: 5,151,798

[45] Date of Patent: Sep. 29, 1992

[54] HOLOGRAM SCALE

[75] Inventor: Hiroyuki Okubo, Kanagawa, Japan

[73] Assignee: Sony Magnescale Inc., Tokyo, Japan

[21] Appl. No.: 745,706

[22] Filed: Aug. 16, 1991

[30] Foreign Application Priority Data

Aug. 30, 1990 [JP] Japan ................................ 2-229153

[51] Int. Cl.⁵ .......................... G02B 5/32; G03H 1/02

[52] U.S. Cl. .......................................... 359/1; 359/15; 359/566

[58] Field of Search ........................ 359/15, 24, 1, 566; 250/237 G

[56] References Cited

U.S. PATENT DOCUMENTS 4,676,645 6/1987 Taniguchi et al. ............. 250/237 G
4,834,475 5/1989 Robinson .............................. 359/24
4,998,784 3/1991 Freeman et al. ....................... 359/15
5,033,817 7/1991 Stephens ............................ 359/566
5,066,525 11/1991 Nakamachi et al. .................. 359/15

*Primary Examiner*—Bruce Y. Arnold
*Assistant Examiner*—Martin Lerner
*Attorney, Agent, or Firm*—Lewis H. Eslinger; Jay H. Maioli

[57] ABSTRACT

A hologram scale is comprised of a hologram grating plate in which a hologram grating is formed, and a protecting substrate on which an origin and/or fixed point detecting scale of the hologram grating is formed, wherein the protecting substrate is bonded to the hologram grating plate so as to cover the hologram grating plate at its surface on which the hologram grating is formed. Also, a hologram scale is comprised of a hologram grating plate in which a hologram grating is formed, an origin and/or fixed point detecting scale substrate on which an origin and/or fixed point detecting scale of the hologram grating is formed, and a protecting substrate to which the hologram grating plate and the origin and/or fixed point detecting scale substrate are both bonded.

6 Claims, 4 Drawing Sheets

HOLOGRAM SCALE

BACKGROUND OF THE INVENTION

1. Field of the Invention

The present invention generally relates to hologram scales and, more particularly, is directed to a hologram scale suitably applied to a position detecting device of an absolute system which detects, for example, a relative displacement amount between two members which are relatively displaced from each other as an absolute position from an origin on the scale.

2. Description of the Related Art

Generally, a conventional hologram scale is utilized as a so-called incremental scale. When this incremental scale is in use, a hologram scale on which a scale is formed by hologram gratings is located to one member and a detector for generating a pulse corresponding to the number of gratings by reading the scale is located to the other member which is relatively displaced from one member. Then, the relative displacement amount between one and the other members can be measured by adding the number of pulses.

However, since the conventional hologram scale is utilized as the incremental scale as described above, the origin of the coordinate system must be set again after the measuring work is interrupted and the power switch of the hologram scale is turned off or after the occurrence of power failure. Further, if the calculated value of the pulses becomes erroneous due to a noise once, then the following calculated values all become erroneous, which requires the origin to be set again similarly as described above.

OBJECTS AND SUMMARY OF THE INVENTION

Accordingly, it is an object of the present invention to provide an improved hologram scale in which the aforementioned shortcomings and disadvantages of the prior art can be eliminated.

More specifically, it is an object of the present invention to provide a hologram scale having an origin and/or fixed point detecting function and which can be served also as an absolute scale.

Another object of the present invention is to provide a hologram scale which is relatively excellent in wearproof property and in environmental capabilities.

Still another object of the present invention is to provide a hologram scale which can be made small, light-weight and inexpensive.

A further object of the present invention is to provide a hologram scale which can be manufactured efficiently.

Yet a further object of the present invention is to provide a hologram scale which can be made inexpensive and which can be manufactured efficiently when manufactured as a long hologram scale.

As a first aspect of the present invention, a hologram scale is comprised of a hologram grating plate in which a hologram grating is formed, and a protecting substrate on which an origin and/or fixed point detecting scale of the hologram grating is formed, wherein the protecting substrate is bonded to the hologram grating plate so as to cover the hologram grating plate at its surface on which the hologram grating is formed.

In accordance with a second aspect of the present invention, a hologram scale is comprised of a hologram grating plate in which a hologram grating is formed, an origin and/or fixed point detecting scale substrate on which an origin and/or fixed point detecting scale of the hologram grating is formed, and a protecting substrate to which the hologram grating plate and the origin and/or fixed point detecting scale substrate are both bonded.

The above and other objects, features, and advantages of the present invention will become apparent from the following detailed description of illustrative embodiments thereof to be read in conjunction with the accompanying drawings, in which like reference numerals are used to identify the same or similar parts in the several views.

DETAILED DESCRIPTION OF THE PREFERRED EMBODIMENTS

The present invention will now be described with reference to FIGS. 1 through 5.

Figure 1:
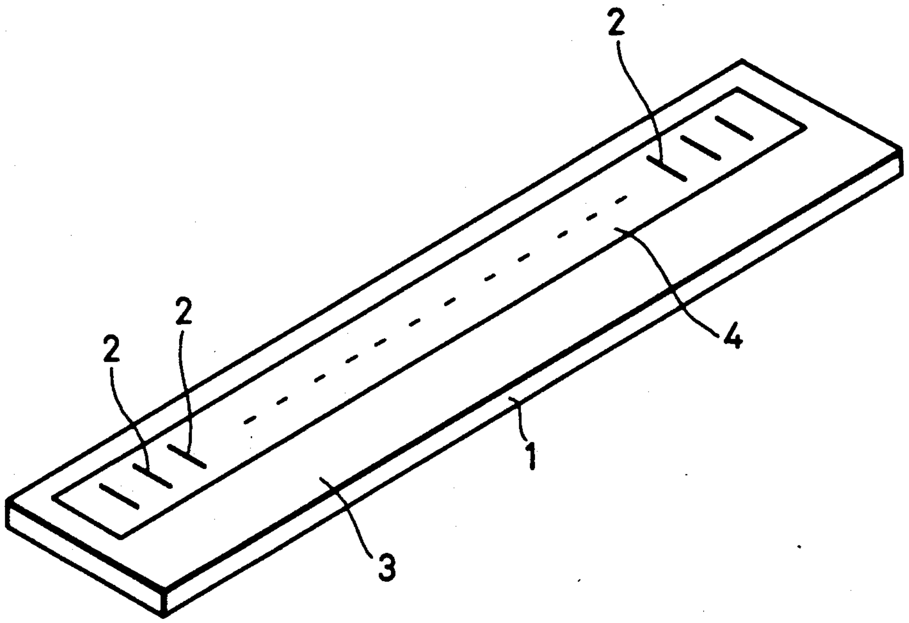
FIG. 1 is a perspective view illustrating an arrangement of a hologram grating plate used in the hologram scale of the present invention.

FIG. 1 shows a perspective view of an example of a hologram grating plate used in the present invention.

It will be seen in FIG. 1 that a hologram grating plate 1 has hologram gratings 2 and a photosensitive layer-removed portion 3 formed thereon. The hologram grating plate 1 is similar to that described, for example, in Japanese patent application No. 1-47901 and in this hologram grating plate 1, a photosensitive layer 4 as a halide material is formed on one surface portion of a plate material, i.e., a dry plate which is mainly made of glass. Then, after interference fringes are exposed to and recorded on the photosensitive layer 4, the photosensitive layer 4 is developed and then the hologram gratings 2 are formed on the photosensitive layer 4. The photosensitive layer-removed portion 3 is formed by removing the photosensitive layer 4 at its portion except the portion in which the hologram gratings 2 are formed.

Figure 2:
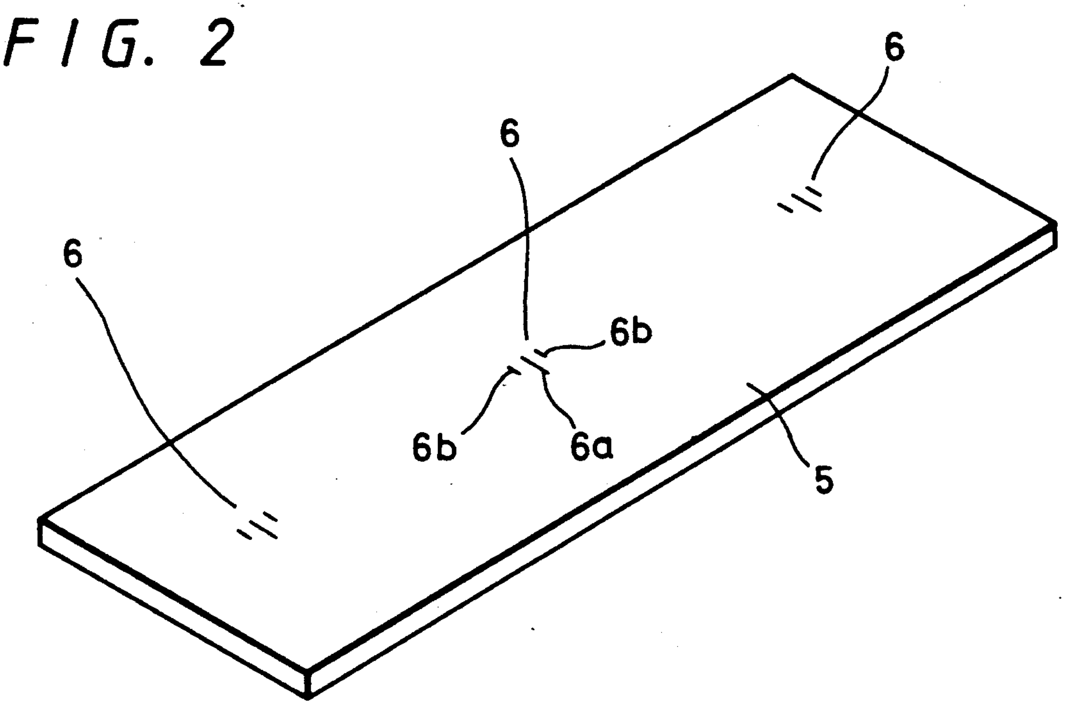
FIG. 2 is a perspective view illustrating an arrangement of a protecting substrate used in the hologram scale of the present invention.

FIG. 2 shows a perspective view of an arrangement of a protecting substrate 5 made of a glass plate used in the hologram scale. In the example of FIG. 2, three scales 6 for detecting an origin and/or fixed point are formed on the protecting substrate 5. The scales 6 for detecting the origin and/or fixed point can be accurately and easily formed on the protecting substrate 5 at its predetermined positions by conventional techniques, such as photolithography technique, electron beam etching technique, ruling engine technique or the like. Further, the number of scales 6 is not limited to three and only one scale 6 may be formed on the protecting substrate 5. Furthermore, while each of the origin and/or fixed point detecting scales 6 is composed of one main scale *6a* and two sub-scales *6b*, *6b* at both sides of the main scale *6a* as shown in FIG. 2, only one main scale *6a* is possible and moreover, a large number of scales may be formed on the protecting substrate 5.

Figure 3:
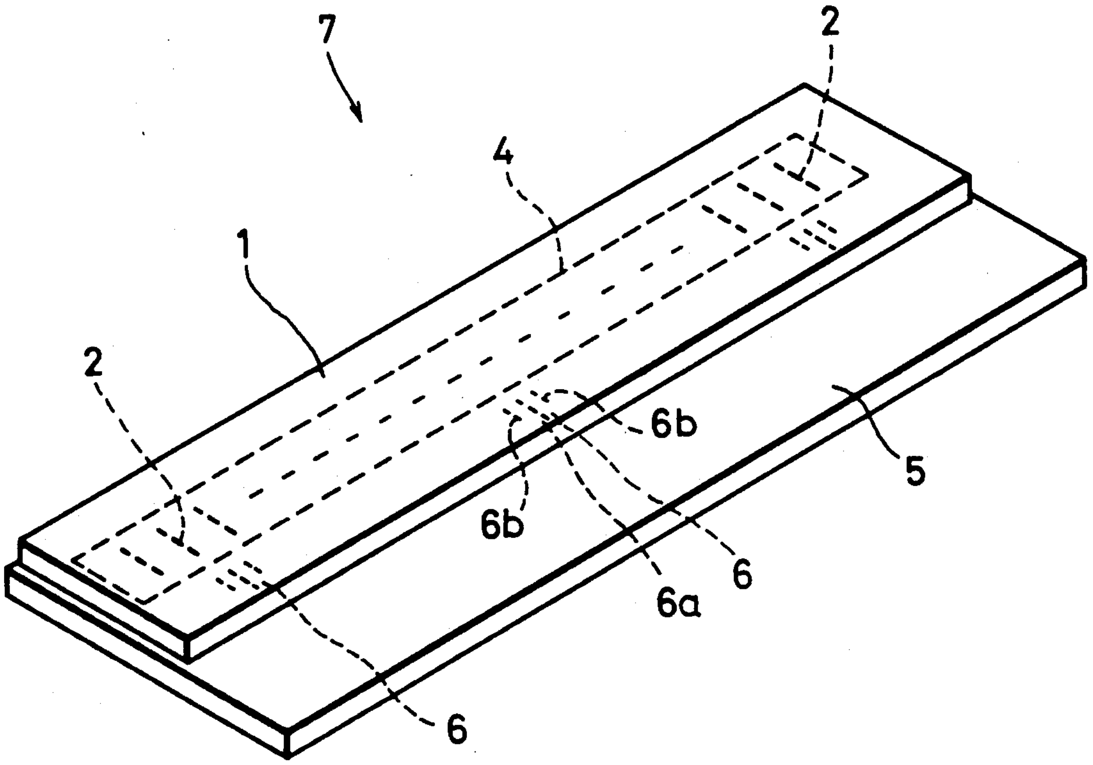
FIG. 3 is a perspective view illustrating an arrangement of a first embodiment of a hologram scale according to the present invention.

When a hologram scale 7 is formed by using the hologram grating plate 1 shown in FIG. 1 and the protecting substrate 5 shown in FIG. 2, as shown in FIG. 3, the hologram grating plate 1 and the protecting substrate 5 are opposed at their surfaces in which the hologram gratings 2 are formed and on which the origin and/or fixed point detecting scale 6 is formed. Then, the protecting substrate 5 and the hologram grating plate 1 are bonded together such that the protecting substrate 5 covers the entire surface of the photosensitive layer 4 in which the hologram gratings 2 are formed, thereby the hologram scale 7 being formed. If a transparent adhesive agent layer, for example, is formed on the whole surface of the bonded portion in which the hologram grating plate 1 and the protecting substrate 5 are brought in contact with each other or if the transparent adhesive agent layer is formed on the four peripheral side edges of the hologram grating 2, then the hologram grating 2 can be formed as a moisture-proof structure.

As described above, according to the first embodiment shown in FIG. 3, since the origin and/or fixed point detecting scale 6 formed on the protecting substrate 5 unitarily bonded to the hologram grating plate 1 functions as an origin and/or fixed point detecting scale of the hologram scale 7, this hologram scale 7 can be served as the absolute scale. Further, since the origin and/or fixed point detecting scale 6 is covered with the hologram grating plate 1 for protection and since the hologram grating 2 is covered with the protecting substrate 5 for protection, the hologram scale 7 of the present embodiment is comparatively excellent in wear-proof property and in environmental capabilities.

Figure 4:
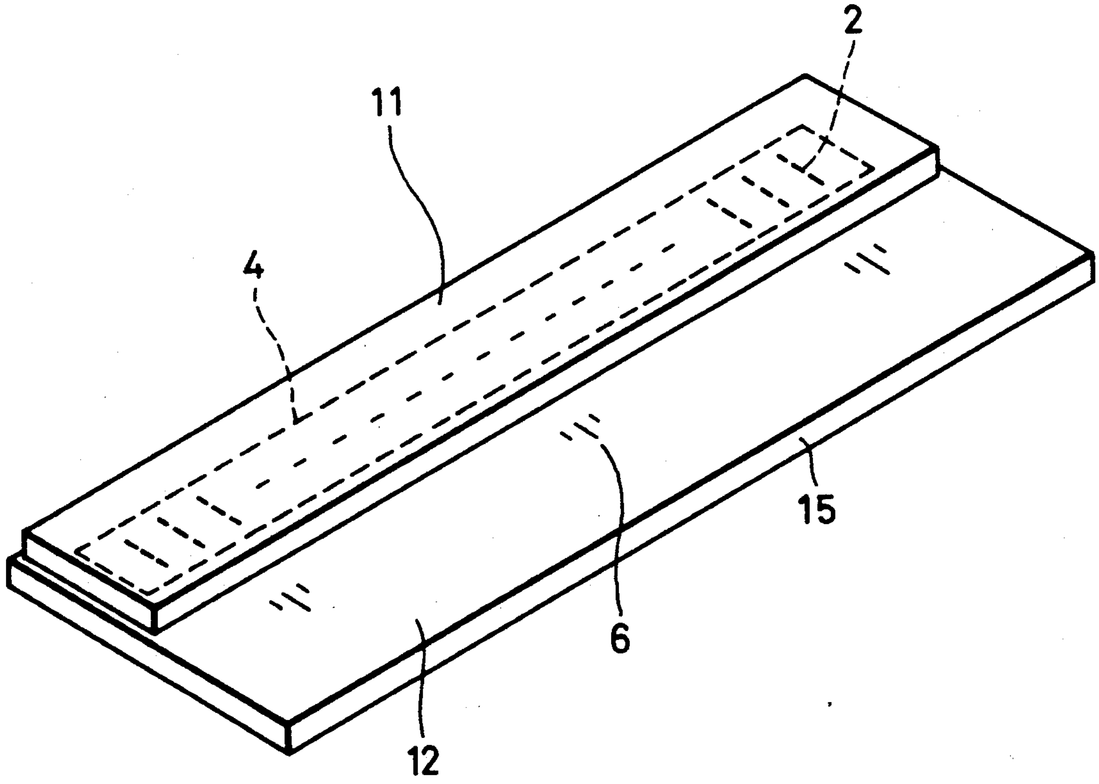
FIG. 4 is a perspective view illustrating an arrangement of a second embodiment of the hologram scale according to the present invention.

FIG. 4 shows a second embodiment of the hologram scale according to the present invention. In FIG. 4, like parts corresponding to those of FIGS. 1, 2 and 3 are marked with the same references and therefore need not be described in detail.

In the second embodiment, referring to FIG. 4, it will be seen that the origin and/or fixed point detecting scale 6 is formed on a non-bonded portion 12 in which a hologram grating plate 11 is not bonded to the protecting substrate 15.

According to this embodiment, the size of the hologram grating plate 11 can be reduced, which can make the hologram scale relatively small, light-weight and inexpensive. Incidentally, the thus arranged hologram scale shown in FIG. 4 depends on the request of the detection optical system.

Figure 5:
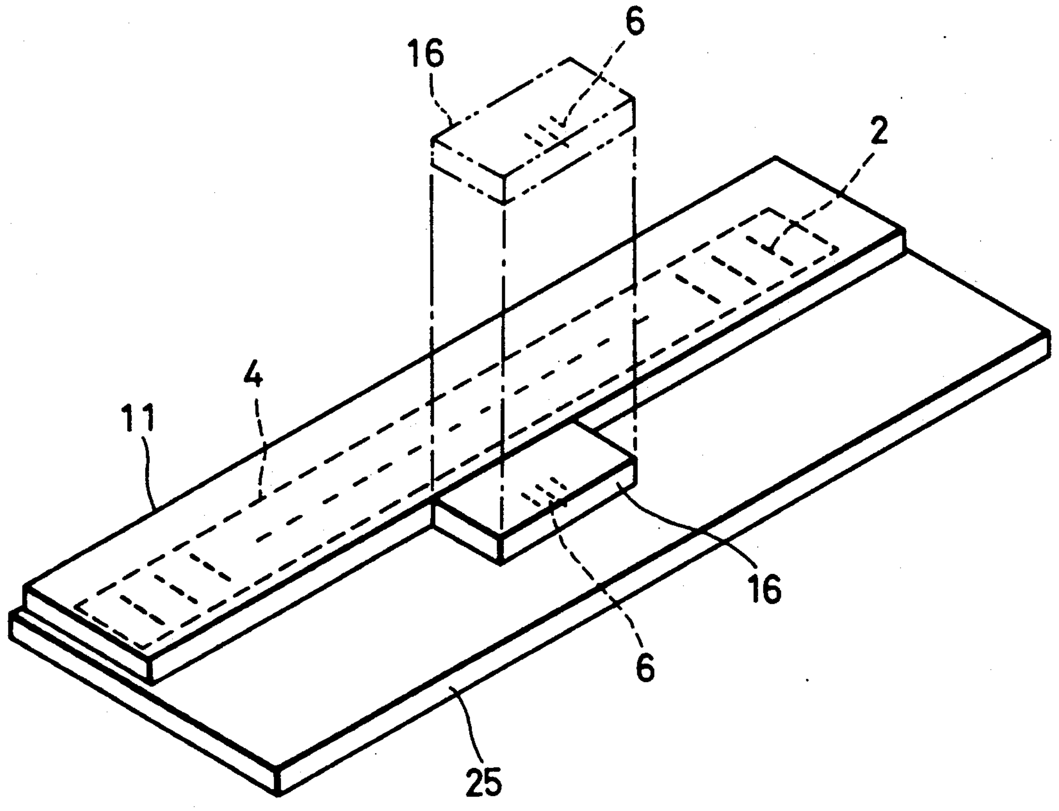
FIG. 5 is a perspective view illustrating an arrangement of a third embodiment of the hologram scale according to the present invention.

FIG. 5 shows a third embodiment of the hologram scale according to the present invention. In FIG. 5, like parts corresponding to those of FIGS. 1, 2, 3 and 4 are marked with the same references and therefore need not be described in detail.

In the third embodiment, it will be seen in FIG. 5 that the hologram grating plate 11 on which the hologram gratings 2 are formed and an origin and/or fixed point detection scale substrate 16 formed of a member different from that of the hologram grating plate 11 and in which the origin and/or fixed point detection scale 6 of the hologram grating 2 is formed are both bonded to a protecting substrate 25.

According to this embodiment, since the scale substrate 16 in which the origin and/or fixed point scale 6 is formed can be additionally provided at a desired position even after the manufacturing of the hologram scale is finished, particularly, a long hologram scale can be made inexpensive and manufactured efficiently.

As set out above, according to the present invention, since the origin and/or fixed point detecting scale formed on the protecting substrate unitarily bonded to the hologram grating plate functions as the origin and/or fixed point detecting scale of the hologram scale, the hologram scale of the present invention can be served as the absolute scale.

Further, according to the present invention, since the origin and/or fixed point detecting scale of the hologram scale is protected by the hologram grating plate, the hologram scale of the present invention is given the origin and/or fixed point detecting function and therefore can be served as the absolute scale. Also, this hologram scale is relatively excellent in wear-proof property and in environmental capabilities.

Furthermore, according to the present invention, the size of the hologram grating plate can be reduced, and this hologram scale has the additional origin and/or fixed point detecting function, thereby being also served as the absolute scale. Also, this hologram scale is small, light-weight and inexpensive.

In addition, according to the present invention, since the origin and/or fixed point scale can be additionally provided at a desired position even after the manufacturing of the hologram scale is finished, the hologram scale of the present invention can be served also as the absolute scale and manufactured efficiently.

Having described the preferred embodiments of the invention with reference to the accompanying drawings, it is to be understood that the invention is not limited to those precise embodiments and that various changes and modifications thereof could be effected by one skilled in the art without departing from the spirit or scope of the novel concepts of the invention as defined in the appended claims.

What is claimed is:

1. A hologram scale comprising:

(a) a hologram grating plate in which a hologram grating is formed; and (b) a protecting substrate on which an origin and/or fixed point detecting scale of said hologram grating is formed, wherein said protecting substrate is bonded to said hologram grating plate so as to cover said hologram grating plate at its surface on which said hologram grating is formed.

2. A hologram scale as claimed in claim 1, wherein said origin and/or fixed point detecting scale is formed on a bonded portion in which said hologram grating plate is bonded to said protecting substrate.

3. A hologram scale as claimed in claim 1, wherein said origin and/or fixed point detecting scale is formed on a non-bonded portion in which said hologram grating plate is not bonded to said protecting substrate.

4. A hologram scale comprising:

(1) a hologram grating plate in which a hologram grating is formed;

(2) an origin and/or fixed point detecting scale substrate on which an origin and/or fixed point detecting scale of said hologram grating is formed; and (3) a protecting substrate to which said hologram grating plate and said origin and/or fixed point detecting scale substrate are both bonded.

5. A hologram scale as claimed in any one of preceding claims 1 to 4, wherein said origin and/or fixed point detecting scale is formed of a single main scale and two sub-scales located at both sides of said main scale.

6. A hologram scale as claimed in claim 1, wherein a plurality of said origin and/or fixed point detecting scales are located on said protecting substrate.

* * * * *